(12) United States Patent
Ashton

(10) Patent No.: US 7,346,201 B2
(45) Date of Patent: Mar. 18, 2008

(54) SEMI-AUTOMATED MEASUREMENT OF ANATOMICAL STRUCTURES USING STATISTICAL AND MORPHOLOGICAL PRIORS

(75) Inventor: Edward Ashton, Webster, NY (US)

(73) Assignee: VirtualScopics LLC, Pittsford, NY (US)

( * ) Notice: Subject to any disclaimer, the term of this patent is extended or adjusted under 35 U.S.C. 154(b) by 514 days.

(21) Appl. No.: 10/670,564

(22) Filed: Sep. 26, 2003

(65) Prior Publication Data

US 2005/0069183 A1   Mar. 31, 2005

(51) Int. Cl.
*G06K 9/00* (2006.01)

(52) U.S. Cl. ............... 382/128; 382/170; 382/224

(58) Field of Classification Search ........ 382/128–134, 382/170, 224

See application file for complete search history.

(56) References Cited

U.S. PATENT DOCUMENTS

| | | | | |
|---|---|---|---|---|
| 6,249,594 | B1 * | 6/2001 | Hibbard | 382/128 |
| 6,625,303 | B1 * | 9/2003 | Young et al. | 382/132 |
| 7,027,650 | B2 * | 4/2006 | Williame et al. | 382/215 |
| 2001/0036302 | A1 * | 11/2001 | Miller | 382/128 |
| 2002/0122596 | A1 * | 9/2002 | Bradshaw | 382/226 |

OTHER PUBLICATIONS

Ashton et al., A novel Volumetric Feature Extraction Technique with Applications to MR Images, IEEE Transactions on Medical Imaging, vol. 16, No. 4, Aug. 1997, pp. 365-371.

Ashton et al., Automated Measurement of Structures in CT and MR Imagery: A Validation Study, pp. 301-305, 2001.

Taylor et al., Image Segmentation Using Globally Optimal Growth in Three Dimensions with an Adaptive Feature Set, SPIE, vol. 2359, pp. 98-107, 1998.

De Fruijne et al., Localization and Segmentation of Aortic Endografts Using marker Detection, IEEE Transactions on Medical Imaging, vol. 22, No. 4, Apr. 2003, pp. 473-482.

Sato et al., Three-Dimensional multi-Scale Line Filter for Segmentation and Visualization of Curvilinear Structures in Medical images, Medical image Analysis, vol. 2, No. 2, pp. 143-168 (1998).

Chung et al., 3-D Reconstruction from Tomographic Data Using 2-D Active Contours, Computers and Biomedical Research 33, pp. 186-210 (2000).

Krissian et al., Model-Based Detection of Tubular Structures in 3-D Images, Computer Vision and Image Understanding 80, pp. 130-171 (2000).

Hsu et al., Comparison of Automated and Manual MRI Volumetry of Hippocampus in Normal Aging and Dementia, Journal of Magnetic Resonance Imaging 16, pp. 305-310 (2000).

Cohen Note on Active Contour Models and Balloons, CVGIP: Image Understanding Vo. 53, No. 2, pp. 211-218, Mar. 1991.

(Continued)

*Primary Examiner*—Matthew C. Bella
*Assistant Examiner*—Shefali Patel
(74) *Attorney, Agent, or Firm*—Blank Rome LLP

(57) ABSTRACT

Structures are delineated in medical or other images. First, various tissue types present in the image are statistically described using a maximum likelihood classifier. Second, the tissue of interest is described using an exemplar, which is derived either from an anatomical atlas or from user input. Third, the structure of interest is morphologically described. The process can be iterated until a desired level of accuracy is achieved.

31 Claims, 5 Drawing Sheets

OTHER PUBLICATIONS

Carlbom et al., Computer-Assisted Registration, Segmentation, and 3D Reconstruction from Images of Neuronal Tissue Sections, IEEE Transactions on Meeical Imaging, vol. 13, No. 2, pp. 351-362, Jun. 1994.

Aylward et al., Initialization, Noise, Singularities, and Scale in Height Ridge Traversal for Tubular Object Centerline Extraction, IEEE Transactions on Medical imaging, Vo. 21, No. 2, pp. 61-75, Feb. 2002.

Fiebick et al., Computer Assisted Diagnosis in CT Angiography of Abdominal Aortic Aneurysms, SPIE, vol. 3034, pp. 86-94.

Bulpit et al., Spiral CT of Abdominal Aortic Aneurysms: Comparison of Segmentation with an Automatic 3D Deformable Model and Interactive Segmentation, SPIE, vol. 3338, pp. 938-946, Feb. 1998.

Wink, Fast Delineation and Visualization of Vessels in 3-D Angiographic Images, IEEE Transactions on Medical Imaging, vol. 19, No. 4, pp. 337-346, Apr. 2000.

Verdonck et al., Accurate Segmentation of Blood Vessels from 3D Medical Images, IEEE, pp. 311-314, 1996.

* cited by examiner

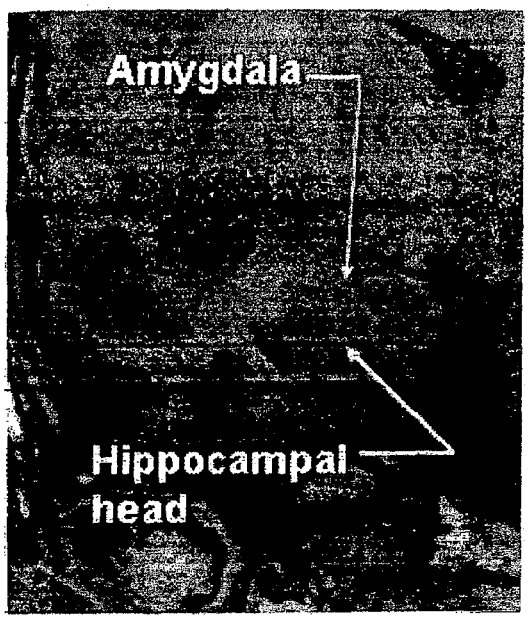
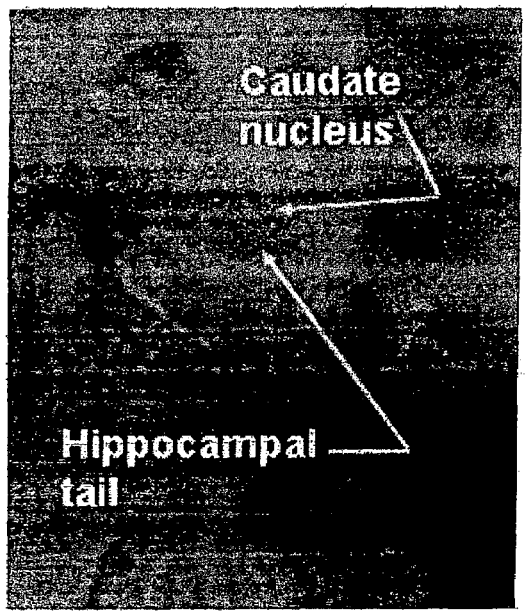
FIG. 3A  FIG. 3B
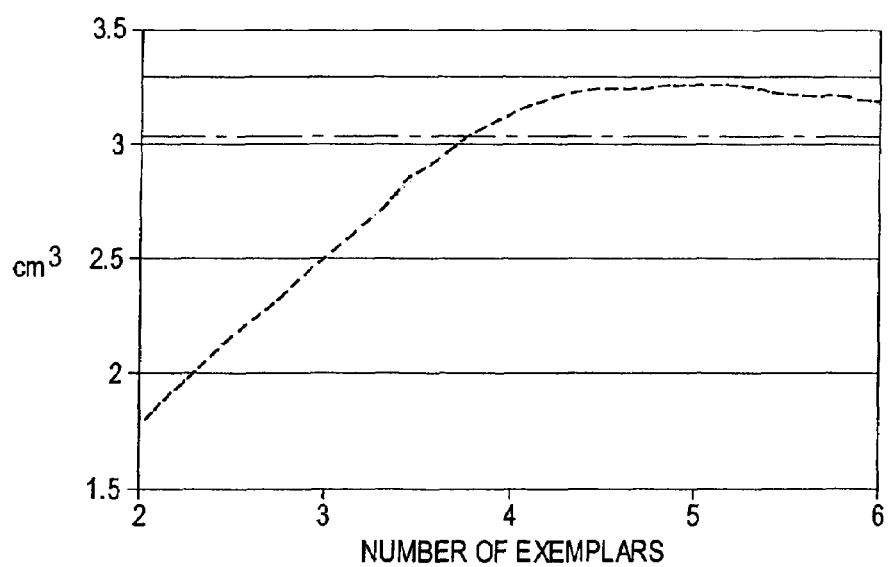
FIG. 5

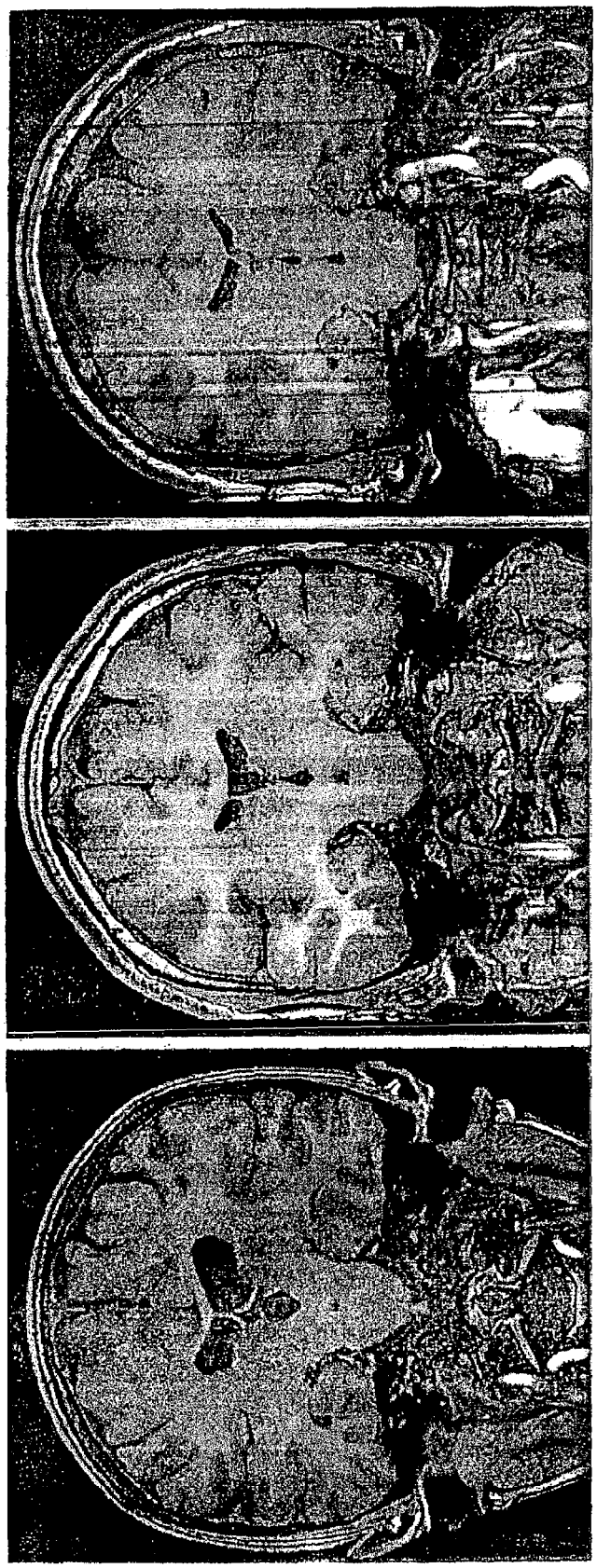

SEMI-AUTOMATED MEASUREMENT OF ANATOMICAL STRUCTURES USING STATISTICAL AND MORPHOLOGICAL PRIORS

FIELD OF THE INVENTION

The present invention is directed to a system and method for measuring anatomical structures in medical images, such as those generated by magnetic resonance imaging (MRI), computed tomography (CT), positron emission tomography (PET), etc, and more particularly to a system and method in which the measurement is semi-automated and makes use of statistical and morphological priors in the form of user-defined exemplars, seed regions, shape models, or other guiding information.

DESCRIPTION OF RELATED ART

Accurate identification and measurement of various anatomical structures is a vital tool both for surgical planning and for evaluation of disease progression and patient response to therapy for numerous diseases. Measurement of hippocampal volume is an important endpoint for diagnosing and monitoring both intractable temporal lobe epilepsy and Alzheimer's disease. Identification of the aorta and associated vessels and measurement of various related parameters are vital tools for evaluation of abdominal aortic aneurism progression and response to treatment. Measurement of the spinal cord and associated cerebrospinal fluid can be an important tool for surgical planning.

Current standard methods for obtaining these data points are largely manual and subjective, and are therefore both error-prone and subject to inter- and intra-operator variability. In addition, manual tracing of structures such as the vascular system, which may appear on up to 800 images in a single study, requires both considerable expertise and a great deal of time. Significant research effort has been devoted to the subject of identification of curvilinear and poorly defined structures in medical images, but there is at this time no generally accepted solution.

de Bruijne et al. (M. de Bruijne, W. Niessen, J. Maintz, M. Viergever, "Localization and segmentation of aortic endografts using marker detection," *IEEE Trans. Medical Imaging* 22(4), pp. 473-482, 2003) have demonstrated a method for identifying aortic stents after surgery through use of radio-opaque markers sewn into the stent prior to surgical implantation.

Ashton et al. (E. Ashton, K. Parker, M. Berg, C. Chen, "A novel volumetric feature extraction technique, with applications to MR images," *IEEE Trans. Medical Imaging* 16(4), pp. 365-371, 1997) and Hsu et al. (Y. Hsu, N. Schuff et al., "Comparison of automated and manual MRI volumetry of hippocampus in normal aging and dementia," *Journal of MRI* 16, pp. 305-310, 2002) have presented semi-automated methods for the identification and measurement of the hippocampus.

Ashton et al. (E. Ashton, S. Totterman, C. Takahashi, J. Tamez-Pena, K. Parker, "Automated measurement of structures in CT and MR imagery: A validation study." *Proc. IEEE Symposium on Computer-Based Medical Systems*, pp. 300-306, 2001) have presented a method for identification and measurement of structures with simple (ovoid) shape, such as solid soft-tissue tumors.

Taylor and Barrett (D. Taylor, W. Barrett, "Image segmentation using globally optimum growth in three dimensions with an adaptive feature set." *Visualization in Biomedical Computing* 1994, pp. 98-107, 1994) have presented a method for segmentation of structures using competitive region growth without any a priori shape constraint.

Carlbom et al. (I. Carlbom, D. Terzopoulos, K. Harris, "Computer assisted registration, segmentation and 3D reconstruction from images of neuronal tissue sections," *IEEE Trans. Med. Imaging*, pp. 351-362, 1994) have presented a method for application of deformable templates to segmentation of neurological structures.

Numerous researchers, including Cohen (L. Cohen, "On active contour models and balloons," *CVGIP: Graphical Models Image Processing*, pp. 211-218, 1991) and Chung (R. Chung, C. Ho, "3-D reconstruction from tomographic data using 2-D active contours," *Computers and Biomedical Research*, pp. 186-210, 2000) have demonstrated the use of 2-D active contours (snakes) and their derivatives in providing edge-based structural identification in medical images.

Sato et al. (Y. Sato, S. Nakajima, N. Shiraga, H. Atsumi, S. Yoshida, T. Koller, G. Gerig, R. Kikinis, "Three-dimensional multi-scale line filter for segmentation and visualization of curvilinear structures in medical images," *Medical Image Analysis*, pp. 143-168, 1998) have described a segmentation method geared towards vascular and other curvilinear structures using a hierarchical filtering approach.

Aylward and Bullitt (S. Aylward, E. Bullitt, "Initialization, noise, singularities, and scale in height ridge traversal for tubular object centerline extraction," *IEEE Trans. Med. Imaging*, pp. 61-75, 2002) have proposed a method for identifying the center line of structures such as the vascular system.

Krissian et al. (K. Krissian, G. Malandain, N. Ayache, R. Vaillant, Y. Trousset, "Model-based detection of tubular structures in 3-D images," *Comput. Vis. Image Understanding*, pp. 130-171, 2000) have demonstrated a method for identifying tubular structures such as the abdominal vasculature using a shape model approach. This approach and those described in the previous two references work well as long as the shape assumptions are valid. However, they have difficulty when these assumptions break down, as at bifurcations. In addition, these methods are not able to identify associated structures such as thrombus or calcifications, and have not been demonstrated to be effective in cases where significant artifacts are present, as in post-aortic endograft CT images.

Other methods that are able to segment aortic vessel boundaries but not thrombus, and which have significant difficulty with bifurcation points and tortuous vessels include:

O. Wink, W. Niessen, M. Viergever, "Fast delineation and visualization of vessels in 3-D angiographic images," *IEEE Trans. Med. Imaging*, pp. 337-346, 2000.

B. Verdonck, I. Bloch, H. Maitre, D. Vandermeulen, P. Suentens, G. Marchal, "Accurate segmentation of blood vessels from 3D medical images," *IEEE Int. Conf. Image Processing*, pp. 311-314, 1996.

M. Fiebich, M. Tomiak, R. Engelmann, J. McGilland, K. Hoffman, "Computer assisted diagnosis in CT angiography of abdominal aortic aneurysms," Proceedings of SPIE vol. 3034, pp.86-94, 1997.

A. Bulpitt, E. Berry, "Spiral CT of abdominal aneurysms: comparison of segmentation with an automatic 3D deformable model and interactive segmentation," in *Proceedings of SPIE vol.* 3338, pp. 938-946, 1998.

SUMMARY OF THE INVENTION

There is a need for a fast, accurate, and precise system and method for the identification and measurement of tortuous, curvilinear, or bifurcating structures in medical images. It is therefore an object of the invention to provide such a system and method.

It is another object of the invention to provide such a system and method that operate rapidly and accurately.

It is still another object of the invention to provide such a system and method that minimize both intra-operator and inter-operator variation.

It is yet another object of the invention to provide such a system and method that can be adapted to the identification of a wide variety of normal and abnormal biological structures in medical images.

To achieve the above and other objects, the present invention is directed to a method for automating the identification, delineation, and measurement of various anatomical structures in medical images. This method makes use of three types of information: (1) Statistical description of the various tissue types present in the images. This information is obtained automatically through the use of a maximum likelihood classifier. (2) Statistical description of the tissue of interest. This information is obtained by making use of an anatomical atlas or user input—typically a small seed region or an exemplar. (3) Morphological description of the structure of interest. This information is taken from an a priori shape model and/or one or more user-defined exemplar regions.

BRIEF DESCRIPTION OF THE DRAWINGS

A preferred embodiment of the present invention will be set forth in detail with reference to the drawings, in which:

FIGS. 3A and 3B show raw images of the hippocampus;

FIGS. 4A-4C show sample images used to locate the hippocampus in an experimental verification of the preferred embodiment;

FIG. 5 shows a plot of experimental results obtained from the image data of FIG. 4A;

DETAILED DESCRIPTION OF THE PREFERRED EMBODIMENT

A preferred embodiment of the present invention, and experimental results therefrom, will now be set forth in detail with reference to the drawings.

Figure 1:
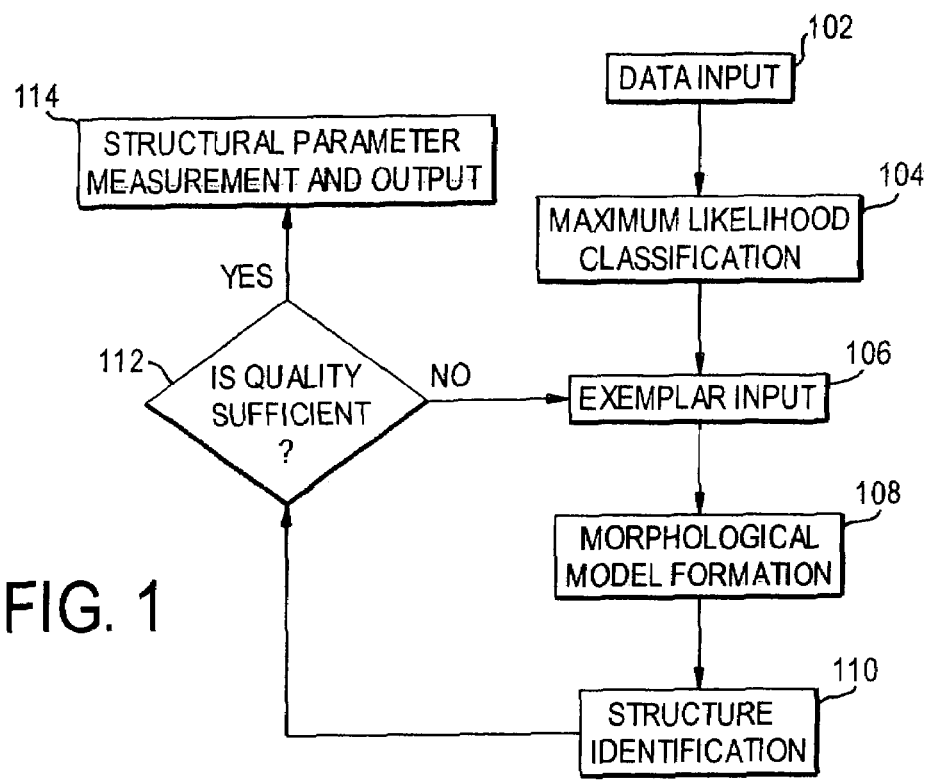
FIG. 1 shows a flow chart of operations of the preferred embodiment.

FIG. 1 shows a flow chart of the operational steps of the preferred embodiment. In step 102, data of an image or a sequence of images are input from a suitable source, e.g., a storage medium on which MRI data have been stored.

The maximum likelihood classification (MLC) of step 104 refers to the process of optimally separating an image into areas of similar statistical behavior. It is assumed that regions of similar statistical behavior will correspond to different tissue types. The goal of the MLC algorithm used in this invention is to globally maximize one of the following discriminant functions:

$$g_i(x) = \ln|p_i| - \frac{1}{2}\ln|R_i| - \frac{1}{2}(x-m_i)^t R_i^{-1}(x-m_i) \tag{1}$$

where $R_i$ is the covariance matrix for class i, $m_i$ is the mean vector for class i, $p_i$ is the a priori probability of class i appearing at the voxel under consideration, and x is the value vector describing the voxel under consideration. This discriminant function is applied to cases where a priori probabilities are available and tissue classes are expected to have different covariance matrices.

$$g_i(x) = -\ln|R_i| - (x-m_i)^t R_i^{-1}(x-m_i) \tag{2}$$

where $R_i$ is the covariance matrix for class i, $m_i$ is the mean vector for class i, and x is the value vector describing the voxel under consideration. This discriminant function is applied to cases where a priori probabilities are not available and tissue classes are expected to have different covariance matrices.

$$g_i(x) = -(x-m_i)^t R_i^{-1}(x-m_i) \tag{3}$$

where $R_i$ is the covariance matrix for class i, $m_i$ is the mean vector for class i, and x is the value vector describing the voxel under consideration. This discriminant function is applied to cases where a priori probabilities are not available and tissue classes are expected to have similar or identical covariance matrices.

Discriminant maximization is accomplished using one of several known optimization techniques, such as alternating estimation (AE), iterated conditional modes (ICM), or simulated annealing (SA).

The statistical description (mean and covariance matrix) of the tissue or structure of interest is obtained through identification of a seed or exemplar region, as input in step 106. This may be accomplished through use of a co-registered anatomical atlas, or by making use of a user's input via a mouse click on a particular location, a manual outlining of a particular structure on one or more images, or the use of a semi-automated method for exemplar delineation on one or more images.

The morphological description of the region of interest is derived in step 108 from the exemplar or seed regions provided by either a user or a co-registered anatomical atlas. If an atlas is used, the morphological description is taken from the shape of the structure in the atlas. If exemplar regions are used, a flexible three-dimensional surface is fit to the boundaries of the exemplar regions. The three dimensional surface may be generated using spatial interpolation, curve fitting, spatial warping, or other appropriate methods. This surface serves as the morphological description of the structure of interest. If a single click or seed region are used, the structure is assumed to be ovoid in cross-section with no assumption as to the shape out of plane.

Structural identification is carried out in step 110 on an image-by-image basis. If exemplar regions are used, the images on which they appear are used to seed this process. If a single click seeding is used, a semi-automated region identification process such as that described previously (Ashton, 1997) is used to identify the structure on the initial image, and that image is then used to seed the structural identification process.

Once the structure of interest has been identified on a given image, a test is applied to determine if the structure should be continued into adjacent images. Each included voxel is shifted based on the direction of the main axis of the morphological model. The discriminant function given in Equation (1), (2) or (3) is then applied to determine if the corresponding voxel on the adjacent image is more likely a member of the structure class or of the background class to which it is currently assigned. If a sufficient number of voxels on the adjacent image are included, the structure is assumed to continue into that image.

Included voxels are then grouped spatially, and a determination is made as to whether the resulting distribution is better described by one or two spatial clusters. If two spatial clusters better describes the distribution, that image is marked as a bifurcation point and two separate regions are propagated from that point forward.

Figure 2C:
FIGS. 2A-2C show the location of lumen in an initial launch image and in a subsequent image.
Figure 2B:
Figure 2A:

This process is illustrated in FIGS. 2A-2C. In FIG. 2A, the dark outline indicates an identification of lumen on the initial launch image. In FIG. 2B, the dark outline indicates a minimum size contour drawn around those points from the initial image that have successfully passed through to the subsequent image. In FIG. 2C, the dark outline indicates the final identification of lumen on the subsequent image.

Once a single pass of this process is complete, the user is able to review the results of the automated structure identification in step 112 in order to verify accuracy. If results are inadequate, additional exemplar regions may be input using the methods described above. New spatial and statistical models are then calculated, and the identification process is repeated. This process continues until sufficient quality is achieved, in which case the structural parameter is measured and output in step 114.

Two experimental applications of this invention are described below. In the first, the invention is used to identify, delineate and measure the hippocampus in T1 weighted MRI images of normal volunteers. In the second, the invention is used to identify, delineate and measure (separately) the lumen and surrounding thrombus in CT images of patients suffering from abdominal aortic aneurisms.

The hippocampus is a gray matter structure of the human brain, located adjacent to the amygdala and the caudate nucleus and attached to the gray matter of the cerebral cortex. See FIGS. 3A and 3B, which show, respectively, separation of the right hippocampal head from the basal nucleus of the amygdala and separation of the left hippocampal tail from the tail of the caudate nucleus. Because the hippocampus is small, tortuous, and lacks clear boundaries with several adjacent structures, its identification and measurement is particularly difficult. The object of this experiment was to determine the accuracy, speed and precision of the system described in this work in identifying and measuring the hippocampus. A data set was obtained which consisted of 5 coronal T1 weighted MRI studies taken from normal volunteers. All volunteers provided informed consent prior to enrollment in this study. MR acquisition was 3D, with a slice thickness of 2.5 mm. Sample images from this data set are given in FIGS. 4A-4C for Subject 1, Subject 5 and Subject 10, respectively.

In order to establish a gold standard and an associated error margin, the hippocampi of each subject were identified by four expert analysts using a computer-aided manual tracing process. The experiment was intended to determine: (1) How many exemplars were required to produce an automated measurement that was statistically indistinguishable from a manual one? (2) What was the time savings associated with this process, as compared to manual tracing? (3) What was the reproducibility of the automated process?

In order to answer the first question, the right hippocampus for Subject 1 was measured, using a varying number of exemplars for morphological model formation. These results were compared to manual measurements of the same structure.

The results of this experiment are given in FIG. 5, which shows a plot of manual vs. automated volume for hippocampal measurement with varying numbers of exemplars. The manual volume + and manual volume − lines represent the mean manual measurement plus and minus one standard deviation. In this case, results with four or more exemplars are statistically indistinguishable from manual measurements.

The question of time savings can be answered by examining the number of exemplars required for adequate results. The hippocampus in this case extended over a total of 16 images. Because only four were needed as exemplars, time savings should be at least 75%. In practice, because the exemplars were defined using single click geometrically constrained region growth (Ashton, 1997) time savings were in excess of 90%.

In the second phase of this experiment, the right hippocampus of each of the five subjects was analyzed four separate times. The intent in this case was to establish the reproducibility of this technique. Results of this experiment are given in Table 1. Clearly, in the case of hippocampal measurement this invention provides clear advantages over current methods in terms of speed, accuracy, and precision.

TABLE 1

Results of hippocampus reproducibility experiment. Numbers are hippocampal volumes in cubic centimeters. Mean coefficient of variability is 2.14%. This compares to reported values of 5%-7% for manual identification.

|  | Repeat 1 | Repeat 2 | Repeat 3 | Repeat 4 | Mean | Std. Dev. | Coef. Var. |
|---|---|---|---|---|---|---|---|
| Subject 1 | 3.143 | 3.284 | 3.183 | 3.268 | 3.22 | 0.68 | 2.1% |
| Subject 2 | 3.34 | 3.351 | 3.379 | 3.154 | 3.306 | 0.10 | 3.1% |
| Subject 3 | 3.219 | 3.21 | 3.27 | 3.259 | 3.24 | 0.03 | 0.9% |
| Subject 4 | 2.647 | 2.836 | 2.79 | 2.748 | 2.755 | 0.08 | 2.9% |
| Subject 5 | 3.069 | 3.179 | 3.132 | 3.179 | 3.14 | 0.05 | 1.7% |

The second application of this invention involves identifying and measuring the vessels and surrounding thrombus of the abdominal vascular system. Accurate mapping and measurement of abdominal aortic aneurisms and the surrounding vasculature is a vital tool for both surgical planning and patient follow-up. Current manual methods for vascular classification are very time consuming, since a typical abdominal CT scan may contain up to 800 individual images. In this case, the goal of the invention is to provide a result that is statistically indistinguishable from a manual identification while enabling a substantial time savings.

In order to provide a point of comparison, a substantial section of abdominal vasculature and thrombus was identified manually five times. The first identification was considered baseline, while the next four were considered repeats. The parameter of interest in this case was the number of voxels classified differently on the baseline and each repeat, expressed as a percentage of total pixels of a given class in the baseline identification. Results of this experiment are given in Table 2.

TABLE 2

Results of manual vasculature identification experiment.
Note that volume differences are small relative to pixel
classification differences, particularly for thrombus
identification.

|  | Repeat 1 | Repeat 2 | Repeat 3 | Repeat 4 |
| --- | --- | --- | --- | --- |
| % Lumen Difference | 12.9 | 12.8 | 14.9 | 12.1 |
| % Thrombus Difference | 43.0 | 43.3 | 45.7 | 44.7 |
| % Lumen Vol. Difference | 5.4 | 10.1 | 11.9 | 1.3 |
| % Thrombus Vol. Difference | 5.6 | 5.6 | 9.2 | 15.6 |

In order to determine both the accuracy and time savings possible using the method described here, a 228 image CT scan was fully identified manually. This identification served as baseline. Varying numbers of exemplars were then used until the results fell within the bounds defined by the previous experiment.

Figure 6A:
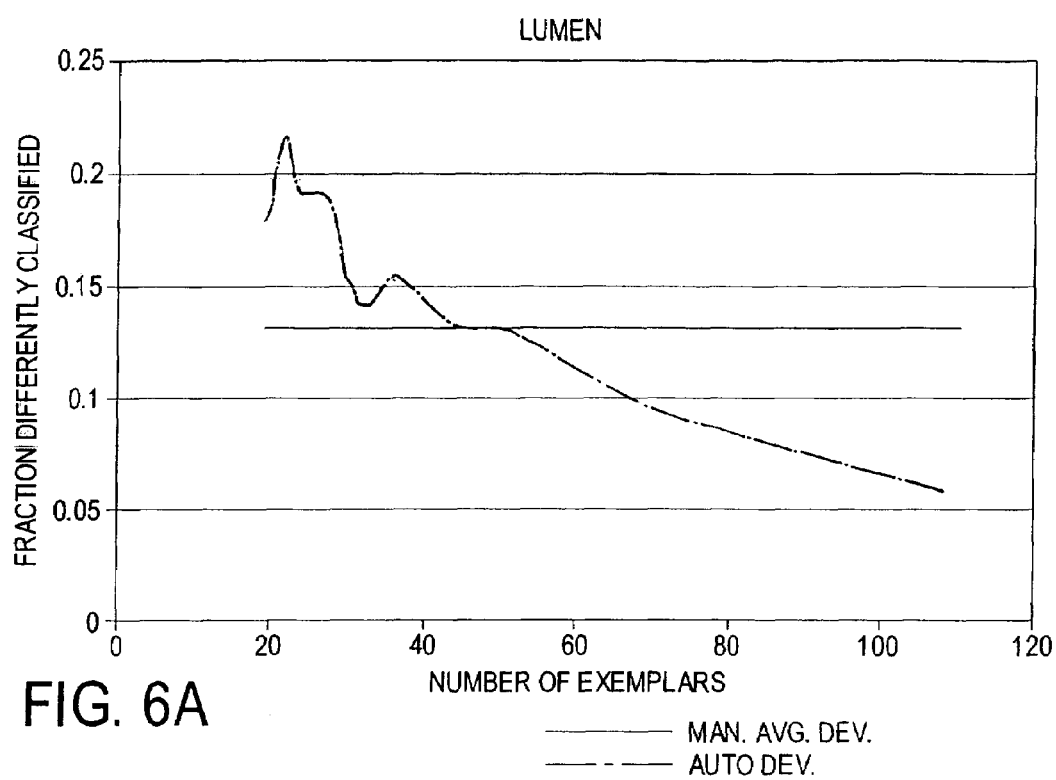
FIGS. 6A and 6B show further experimental results.
Figure 6B:
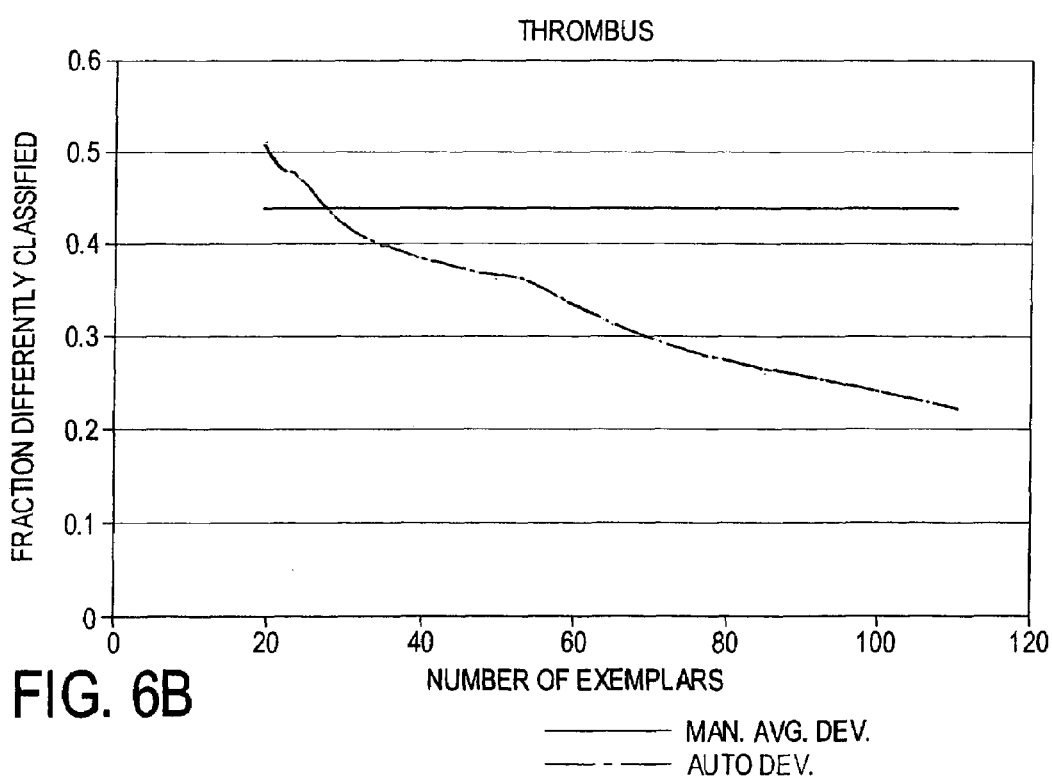

Results of this experiment are shown in FIGS. 6A and 6B. FIG. 6A is a plot showing the decrease in differently classified lumen voxels with increasing numbers of exemplars. Note that the result is statistically indistinguishable from a manual measurement at approximately 50 exemplars. FIG. 6B is a plot showing the decrease in differently classified thrombus voxels with increasing numbers of exemplars. Note that the result is statistically indistinguishable from a manual measurement at approximately 30 exemplars.

The results of this experiment are quite consistent with those of the hippocampus experiment. Results statistically indistinguishable from manual measurement are achieved with roughly one exemplar for every four images. This provides a potential time savings of 75% or more, with an accuracy equal to or better than that provided by manual measurement.

Figure 7:
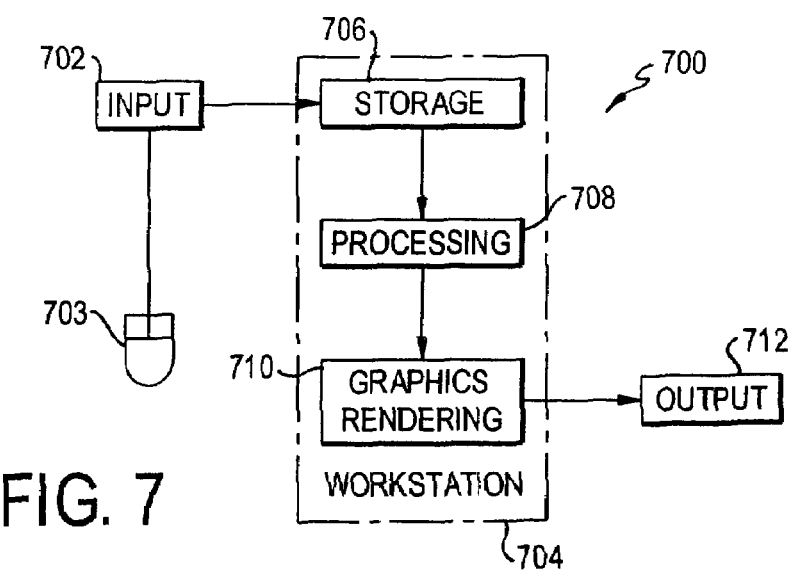
FIG. 7 shows a schematic diagram of a system on which the preferred embodiment can be implemented.

FIG. 7 is a schematic diagram of a system on which the preferred embodiment can be implemented. System 700 includes an input device 702 for input of the image data, the anatomical atlas, and the like. The input device can, as noted above, include a mouse 703. The information input through the input device 702 is received in the workstation 704, which has a storage device 706 such as a hard drive, a processing unit 708 for performing the processing disclosed above, and a graphics rendering engine 710 for preparing the data for viewing, e.g., by surface rendering. An output device 712 can include a monitor for viewing the images rendered by the rendering engine 710, a further storage device such as a video recorder for recording the images, or both.

While a preferred embodiment of the present invention has been set forth in detail, those skilled in the art who have reviewed the present disclosure will readily appreciate that other embodiments can be realized within the scope of the invention. For example, numerical values are illustrative rather than limiting, as are disclosures of specific mathematical formulae. Also, the present invention can be used in the context of any human or non-human tissues or in non-biological contexts. Furthermore, the system on which the invention is implemented can be part of, or separate from, a scanner or other device for taking image data. Therefore, the present invention should be construed as limited only by the appended claims.

I claim:

1. A method for identifying, delineating, and measuring structures in an image, the method comprising:
   (a) receiving image data representing the image;
   (b) statistically identifying types of structures in the image by applying a maximum likelihood classifier to the image data, the maximum likelihood classifier being a classifier which globally maximizes a discriminant function;
   (c) forming a statistical description of a structure of interest in the image in accordance with the types of structures identified in step (b) and an exemplar input which comprises an identification of a seed or an exemplar region in the image;
   (d) forming a morphological description of the structure of interest in accordance with the statistical description formed in step (c) and the exemplar input; and
   (e) forming a structural identification of the structure of interest in accordance with the morphological description formed in step (d) and the exemplar input.

2. The method of claim 1, wherein, in step (b), the maximum likelihood classifier comprises a discriminant function.

3. The method of claim 2, wherein step (b) comprises selecting the discriminant function in accordance with an availability of a priori probabilities.

4. The method of claim 3, wherein step (b) further comprises selecting the discriminant function in accordance with an expectation of whether the types of structures to be statistically identified will have different covariance matrices.

5. The method of claim 1, wherein the exemplar input is derived from a co-registered anatomical atlas.

6. The method of claim 1, wherein the exemplar input is derived from an input manually made by a user.

7. The method of claim 6, wherein the input manually made by the user comprises a mouse click.

8. The method of claim 7, wherein the exemplar region is derived from the mouse click using region identification.

9. The method of claim 8, wherein the region identification uses the maximum likelihood classifier.

10. The method of claim 1, further comprising (f) receiving a verification of an accuracy of structural identification formed in step (e).

11. The method of claim 10, wherein, if it is determined in step (f) that the accuracy is inadequate, steps (c), (d), (e) and (f) are repeated until it is determined in step (f) that the accuracy is adequate.

12. The method of claim 1, wherein the data received in step (a) comprise data of a plurality of images.

13. The method of claim 12, wherein step (e) is performed on an image-by-image basis for the plurality of images.

14. The method of claim 13, wherein step (e) comprises:
   forming the structural identification for one of the images; and
   using the structural identification formed for said one of the images to seed the structural identification in remaining ones of the images.

15. The method of claim 14, wherein step (e) further comprises determining whether each of the remaining ones of the images comprises a bifurcation point of the structure of interest.

16. The method of claim 15, wherein the image is a medical image, and wherein the structures comprise tissues.

17. The method of claim 16, wherein the image is an MRI image.

18. A system identifying, delineating, and measuring structures in an image, the system comprising:
- an input device for receiving image data representing the image; and
- a processor, in communication with the input device, for:
- (a) receiving the image data from the input device;
- (b) statistically identifying types of structures in the image by applying a maximum likelihood classifier to the image data, the maximum likelihood classifier being a classifier which globally maximizes a discriminant function;
- (c) forming a statistical description of a structure of interest in the image in accordance with the types of structures identified in step (b) and an exemplar input;
- (d) forming a morphological description of the structure of interest in accordance with the statistical description formed in step (c) and the exemplar input which comprises an identification of a seed or an exemplar region in the image; and
- (e) forming a structural identification of the structure of interest in accordance with the morphological description formed in step (d) and the exemplar input.

19. The system of claim 18, wherein, in step (b), the maximum likelihood classifier comprises a discriminant function.

20. The system of claim 19, wherein the processor performs step (b) by selecting the discriminant function in accordance with an availability of a priori probabilities.

21. The system of claim 20, wherein step (b) further comprises selecting the discriminant function in accordance with an expectation of whether the types of structures to be statistically identified will have different covariance matrices.

22. The system of claim 18, wherein the processor derives the exemplar input from a co-registered anatomical atlas.

23. The system of claim 18, wherein the processor derives the exemplar input from an input manually made by a user through the input device.

24. The system of claim 23, wherein the input device comprises a mouse, and wherein the input manually made by the user comprises a mouse click.

25. The system of claim 24, wherein the processor derives the exemplar region from the mouse click using region identification.

26. The system of claim 25, wherein the region identification uses the maximum likelihood classifier.

27. The system of claim 18, wherein the processor further (f) receives a verification of an accuracy of structural identification formed in step (e).

28. The system of claim 27, wherein, if it is determined in step (f) that the accuracy is inadequate, the processor repeats steps (c), (d), (e) and (f) until it is determined in step (f) that the accuracy is adequate.

29. The system of claim 18, wherein the data received by the input device comprise data of a plurality of images, and wherein the processor performs step (e) on an image-by-image basis for the plurality of images.

30. The system of claim 29, wherein the processor performs step (e) by:
- forming the structural identification for one of the images; and
- using the structural identification formed for said one of the images to seed the structural identification in remaining ones of the images.

31. The system of claim 30, wherein the processor performs step (e) further by determining whether each of the remaining ones of the images comprises a bifurcation point of the structure of interest.

* * * * *